United States Patent
Anderson

(10) Patent No.: US 9,424,677 B2
(45) Date of Patent: Aug. 23, 2016

(54) EFFICIENT METHOD OF PRODUCING AN ANIMATED SEQUENCE OF IMAGES

(71) Applicant: Danglesnort, LLC, La Jolla, CA (US)

(72) Inventor: Erik Anderson, La Jolla, CA (US)

(73) Assignee: Danglesnort, LLC, La Jolla, CA (US)

( * ) Notice: Subject to any disclaimer, the term of this patent is extended or adjusted under 35 U.S.C. 154(b) by 0 days.

(21) Appl. No.: 14/660,774

(22) Filed: Mar. 17, 2015

(65) Prior Publication Data

US 2015/0187111 A1 Jul. 2, 2015

Related U.S. Application Data

(63) Continuation of application No. 13/102,978, filed on May 6, 2011, now Pat. No. 9,001,128.

(51) Int. Cl.

| G06T 15/50 | (2011.01) |
|---|---|
| G06T 13/20 | (2011.01) |
| G06T 7/20 | (2006.01) |
| G06T 13/40 | (2011.01) |
| G06T 13/60 | (2011.01) |

(52) U.S. Cl.
CPC .............. *G06T 13/20* (2013.01); *G06T 7/2046* (2013.01); *G06T 13/40* (2013.01); *G06T 13/60* (2013.01); *G06T 2200/24* (2013.01); *G06T 2207/30196* (2013.01); *G06T 2207/30201* (2013.01); *G06T 2210/36* (2013.01); *G06T 2210/61* (2013.01); *G06T 2213/08* (2013.01)

(58) Field of Classification Search
None
See application file for complete search history.

(56) References Cited

U.S. PATENT DOCUMENTS

| 5,977,978 A | 11/1999 | Carey et al. |
|---|---|---|
| 6,016,150 A | 1/2000 | Lengyel et al. |
| 6,686,918 B1 | 2/2004 | Cajolet et al. |
| 6,697,062 B1 | 2/2004 | Cabral et al. |
| RE40,224 E | 4/2008 | Prater |
| 7,427,986 B2 | 9/2008 | Pellacini et al. |
| 7,477,777 B2 | 1/2009 | Wells |
| 7,836,086 B2 | 11/2010 | Gregory et al. |
| 7,836,087 B1 | 11/2010 | Gregory et al. |
| 2008/0307304 A1 | 12/2008 | Feiler et al. |
| 2009/0021513 A1 | 1/2009 | Joshi et al. |
| 2011/0216074 A1 | 9/2011 | Witkin et al. |

OTHER PUBLICATIONS

International Search Report and Written Opinion of the International Searching Authority for PCT Application No. PCT/US2012/036341 dated Nov. 28, 2012.

(Continued)

*Primary Examiner* — Peter Hoang
(74) *Attorney, Agent, or Firm* — Charles F. Reidelbach, Jr., Esq.

(57) ABSTRACT

A computer-based method of generating an animated sequence of images eliminates inefficiencies associated with a lighting process. The method begins with the provision of a frame for the animation sequence. The frame includes at least one asset, which may be a character, background, or other object. The frame is rendered to thereby produce a set of images each based upon a different lighting condition. The frame is then composited during which a subset of the images are selected from the set and then adjusted. Settings such as intensity and color balance are adjusted for each of the subset of images.

20 Claims, 7 Drawing Sheets

(56) References Cited

OTHER PUBLICATIONS

Debevec, P. et al. "Acquiring the Reflectance Field of a Human Face," SIGGRAPH 2000 Conference Proceedings of the annual conference on Computer Graphics and Interactive Techniques, USA: ACM Press/Addison-Wesley Publishing Co. New York, 2000, pp. 145-146.

Supplementary European Search Report and European Search Opinion for European Patent Application No. 12782020.7 dated Jan. 19, 2015.

Zhengyou Zhang Ed—Institute of Electrical and Electronics Engineers: "Modeling Geometric Structure and Illumination Variation of a Scene from Real Images," 6th International Conference on Computer Vision. ICCV '98. Bombay, Jan. 4-7, 1998; [IEEE International Conference on Computer Vision], New York, NY: IEEE, US, Jan. 4, 1998, pp. 1041-1046, XP002456316, ISBN: 978-0-7803-5098-4.

Belhumeur, P N et al: "What is the set of images of an object under all possible illumination conditions?", International Journal of Computer Vision, Kluwer Academic Publishers, Norwell, US, vol. 28, No. 3, Jan. 1, 1998, pp. 245-260, XP002393451, ISSN: 0920-5691, DOI: 10.1023/A:1008005721484.

FIG. 1 - PRIOR ART

EFFICIENT METHOD OF PRODUCING AN ANIMATED SEQUENCE OF IMAGES

CROSS REFERENCE TO RELATED APPLICATIONS

This application is a continuation of U.S. application Ser. No. 13/102,978, filed on May 6, 2011, the disclosure of which is incorporated by reference herein.

FIELD OF THE INVENTION

The present invention is generally directed toward the field of computer animations. More particularly, the present invention concerns a way of eliminating a time consuming and laborious lighting process from the production of an animated sequence of images.

BACKGROUND

The production of animated movies, advertisements, and other videos has been transformed in recent years by improvements in technology. For example, Pixar has revolutionized the production of animated videos and movies such as the technology utilized in the movie "Toy Story". Since then the use of related technologies has proliferated to numerous animation production studios. One challenge, however, is the very high cost in producing quality animations as will be described below.

An exemplary first process in animation is described FIG. 1 for creating an "asset". An asset is a virtual animated model or character. An exemplary process for producing an asset can be described as three sub-processes including "modeling" (steps 2, 4, 6), "texturing" (steps 8, 10), and "rigging" (steps 12, 14, 16). Within each of these sub-processes are individual steps as described briefly. The process depicted in FIG. 1 may be a computer-based process whose software may be stored on a media.

According to step 2, an artist conceives concept art. Based on the concept art, a three dimensional computer model is created according to steps 4 and 6. According to steps 8 and 10, the model is textured—an apparent surface finish or surface type (e.g., fur, glass, porous rock, etc.) is provided to the model. According to steps 12 and 14, "rigging" takes place. Rigging is the step of preparing the model for animation and has been described as placing the "bones" into the animated model. More specifically rigging defines which portions of the model are rigid or flexible and which are points or axes of relative rotation of portions of the model with respect to each other. Once rigging is complete, the asset is "published" according to step 16 whereby it is stored on a computer media for use in the production of an animation. The asset according to the exemplary embodiment of FIG. 2 is therefore a computer defined character that includes a three dimensional shape, a texture, and points and/or axes of relative rotation of portions of the three dimensional shape with respect to each other. Other assets can be created that utilize a subset of the processes of FIG. 2 such as an asset is not to be animated such as a fixed background. In that case the asset may not include axes of relative rotation and hence the rigging sub-process would not be necessary. Thus in general an asset may include one or more of shape, texture, points of rotation, or axes of rotation.

Once an asset is published, a set of four major sub-processes is utilized in the conventional process of generating an animated sequence of images using the asset. These include (1) animation, (2) lighting, (3) rendering, and (4) compositing.

Animation is the sub-process of creating a set of keyframes that define the animation. The animator starts with the assets and creates a set layout. Then the animator generates a full set of keyframes based upon the needs of the particular scene. The endpoint of this process is a stored set of keyframes that define the location and movement of the assets.

The second sub-process is lighting in which lighting parameters are adjusted per shot. As a note, a "shot" may include a number of keyframes and is associated with a particular scene in a movie (or other animation). The lighting parameters include lighting type, light position, light color, intensity, shadow softness, rendering quality, and other factors. This is a very labor-intensive, expensive, and time-consuming process in which a large department of lighters may consume more than 100,000 man-hours for a full-length movie.

After lighting is complete the full sequence of frames is rendered. This is very computationally intensive for a movie and, despite improved central processing unit ("CPU") speeds, typically requires a bank of very powerful computers and considerable computation time. The rendered frames are then provided to the compositor who may combine rendered images and make minor adjustments before storing the final product—a fully rendered animated sequence of frames such as a full length movie, commercial, or other video.

As indicated earlier, a very lengthy and costly part of this process is the lighting sub-process. If after lighting the compositor finds that significant changes need to be made in lighting or animation, much of this costly process may need to be repeated, greatly increasing the cost and introducing a significant delay in the overall process. Additionally the lighting process tends to separate the roles of animator and compositor which may impact the quality and creativity of the end product. Therefore there is a need to improve upon this overall process.

DETAILED DESCRIPTION

According to the present invention the conventional "lighting" sub-process between animation and rendering is eliminated. The overall animation process is replaced by a completely different process flow for producing animated sequence of images. A new process according to the present invention is described according to (1)-(4) below. (1) Animation or Compositing Sub-Process: The animator or compositor selects a set of all lights that might be used for the set. This may include an array of dome lights for the overall scene and for individual assets within the scene. It may also include other lights such as lights embedded into assets or that are placed at locations or orientations that are outside of a dome structure. (2) Rendering Sub-Process: An initial rendering renders the full set of lights selected by the animator or compositor for certain selected or important frames. This results in a set of images each of which is an image resultant from one of the overall set of lights. (3) Compositing Sub-Process: The compositor makes a selection of a subset of the lights for the important frames and also selects intensity and color balance values for each light. The compositor may make other selections such as blurring or distortions of images. This selection and adjustment results in a set of data or metadata that defines the selections made by the compositor. (4) Rendering Sub-Process: When the entire animated sequence of frames is rendered, the data or metadata defined by the compositor is used. Thus the subset of light sources and the associated settings (e.g., intensity, color balance, blurring, distortion) are used. In a preferred embodiment a computer-readable storage media comprising computer-executable instructions causes a computing device or one or more processors to perform steps (1)-(4) above. As part of this computer-based process there are various steps in the process in which an animator and/or compositor makes selections utilizing a user interface.

Figure 2:
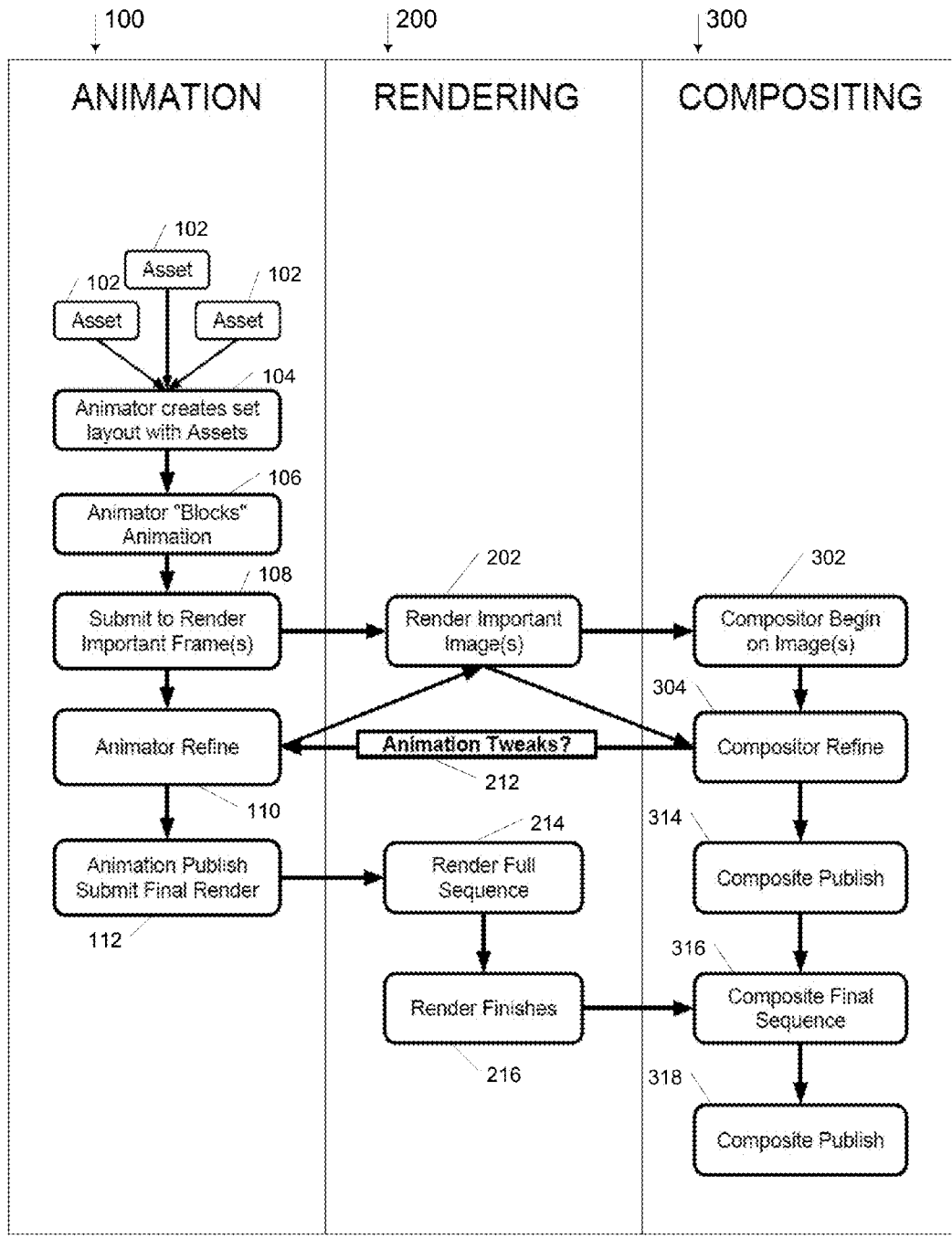
FIG. 2 is a process flow diagram that depicts a new process according to the present invention of generating an animated sequence of images starting with assets.

An exemplary process according to the present invention is depicted in FIG. 2. The depicted process can be broken up into major sub-processes including animation 100, rendering 200, and compositing 300. These major sub-processes are novel and have been improved according to the present invention. This process will result in a rendered animated sequence of images that is based on a set or a scene, which may be part of a larger production of a movie, video, or sequence of multiple scenes. Each of the sub-processes 100, 200, and 300 of FIG. 2 can be embodied as separate software applications that are executed by separate computer systems or they can be one large software application that is executed by a single computer system. Other embodiments are possible in which a single software operation operating on a single computer encompasses portions or various combinations of sub-processes 100, 200, and 300.

Figure 1:
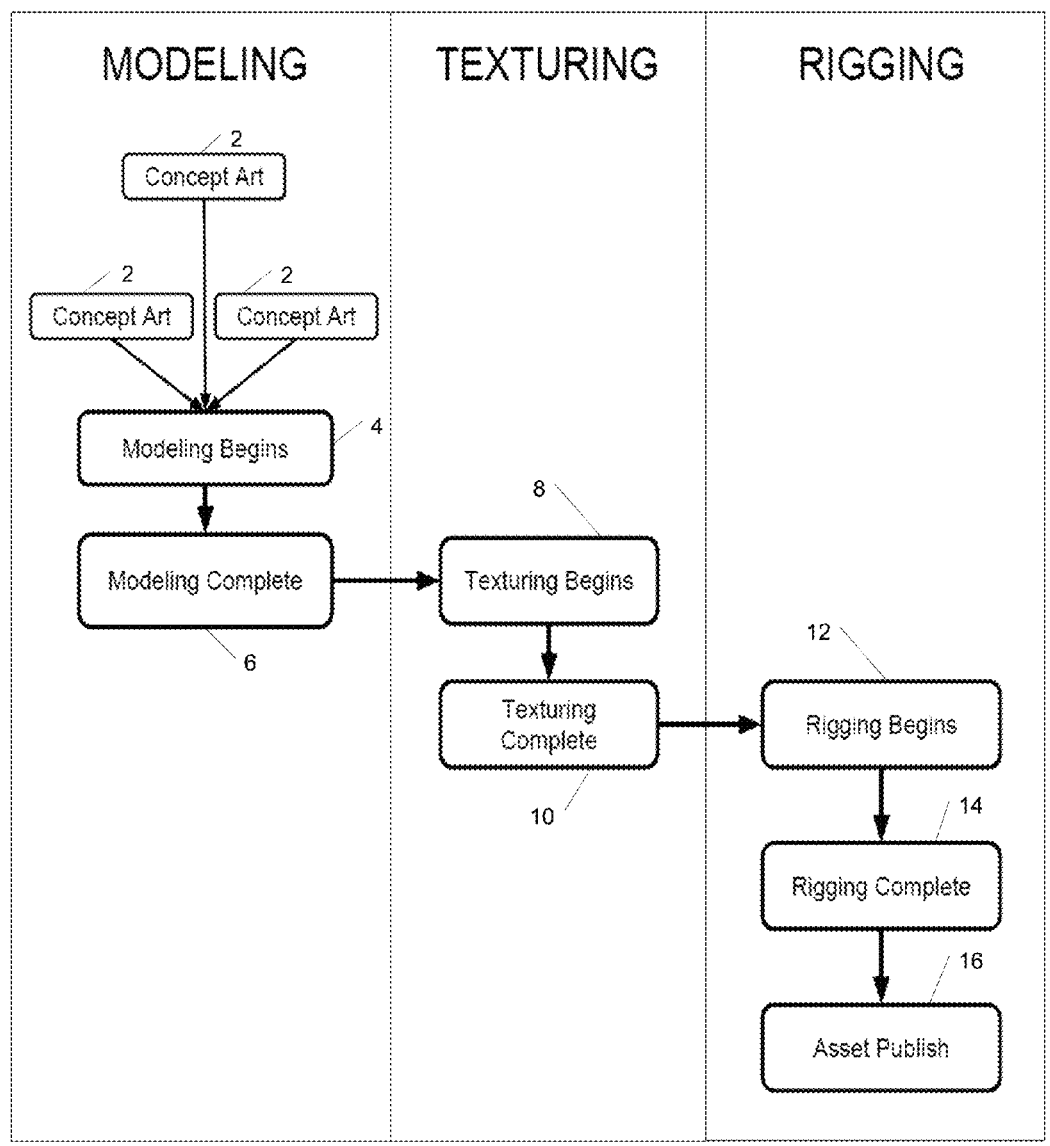
FIG. 1 is a conventional process flow diagram that depicts certain steps that are utilized to generate an asset to be animated.

Within animation sub-process 100, assets are provided according to step 102. The production of assets is described supra (see FIG. 1). According to step 104, an animator creates a "set layout" using the assets. The set layout corresponds to a particular scene.

According to step 106, the animator "blocks" the animation. In doing so the animator defines the major or important frames that bound and/or help to define the animated sequence. As an example, this may include a "before" and "after" frame relative to an action that occurs in the scene. Such important frames may include keyframes.

According to step 108, the animator submits the important frame(s) for rendering. These may be keyframes or they may be other frames within the frame sequence. This step diverges from a more conventional process in which the labor-intensive lighting process begins. Instead, according to step 202, the selected or most important frame(s) are rendered using a variety of different lighting conditions that collective bound what is to be used in the production. In other words, the lighting conditions anticipate different possible lighting selections that are to be made in the compositing sub-process.

Figure 3A:
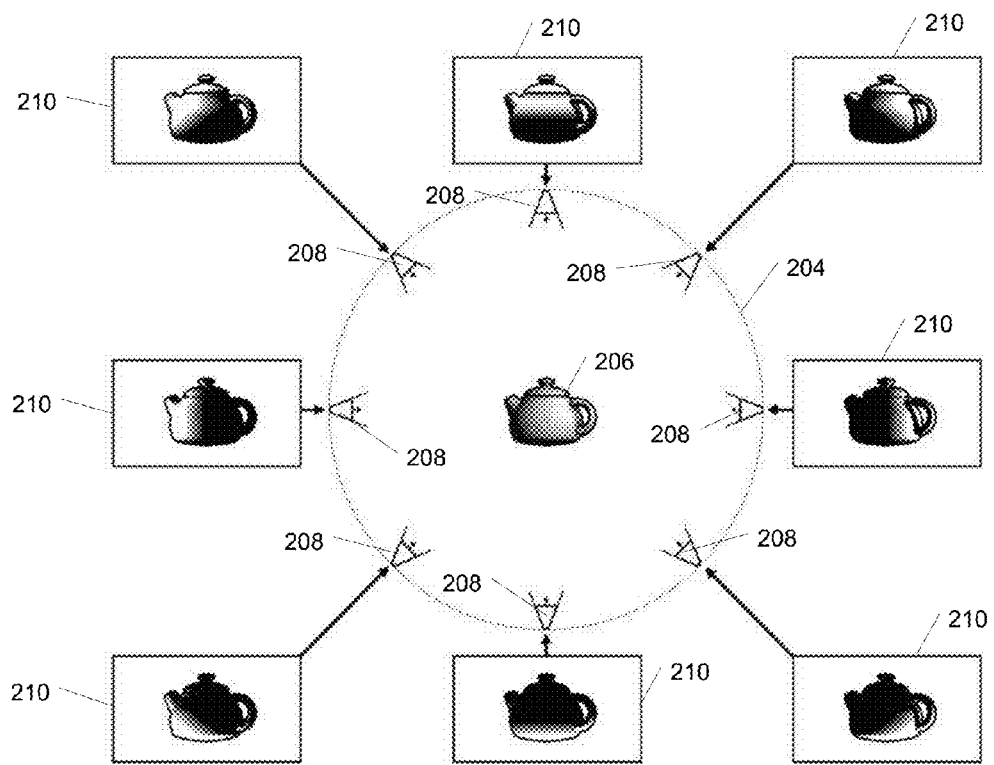
FIG. 3A is a conceptual drawing illustrating the process of rendering an image of an asset for each of a plurality or set of lights.

FIG. 3A depicts conceptually various exemplary illumination conditions that may be utilized according to step 202. A two dimensional representation of a hemispherical "dome" 204 is disposed about an asset 206 to be illuminated. Disposed along the surface of dome 204 are lights 208. Associated with each light 208 is an image 210 of the asset 206 that is generated based upon the impingement of each light source 208 upon asset 206. Thus according to step 202, a set of images 210 are generated based upon the impingement of different lights 208.

In a preferred embodiment, each image 210 is rendered with the respective light projecting as white. Thus color balance of the light is not yet defined or selected. Step 202 is a computer generated rendering process from computations that are based upon positions of virtual light sources 208 relative to a virtual orientation of each pixel of the surface of the asset 206, also taking into account texture of the surface. In an alternative embodiment, each image 210 is monochrome and contains only relative luminance values for each pixel in image 210. These then may be combined with a flat color image, which contains no lighting information and only asset texture color information.

Although only eight light sources are depicted in FIG. 3A it is to be understood that dome 204 is three-dimensional and may include any number of lights 208 from tens to hundreds or even thousands. Thus the set of images 210 generated in step 202 may include any feasible number of images. Also the lights 208 may be disposed upon other surfaces not shown such as rectangular surfaces, cone-shaped surfaces, or they may be suspended at any coordinate. Additionally some light sources 208 used for imaging may be emitted from an asset 206 and the effects of the light source on asset 206 or other assets may be computed in the form of images.

Thus according to step 202, a set of images 210 are rendered such that each image has a different illumination condition. Also according to step 202, data is generated for each image 210. The image file is part of that data. In addition, additional data such as metadata is generated that is used to track each image produced. The metadata for each image 210 may include data elements that specify the image frame, the asset and the light used (which would indicate the position of the light relative to the asset). In some cases an image 210 may be rendered for the entire image frame and would specify the image frame and the light source used.

Turning back to FIG. 2, the set of images 210 is transferred to the compositing sub-process 300 according to step 302. According to step 304 the compositor refines the frame. According to part of step 302, a subset of images 210 are selected from the full set. For the subset of images 210, color balance and illumination intensity are adjusted and the images 210 are combined into a composite image. In addition to the adjustment of color balance and luminance, step 302 may include other adjustments as well such as imparting blurring and distortion effects upon the image.

Figure 3B:
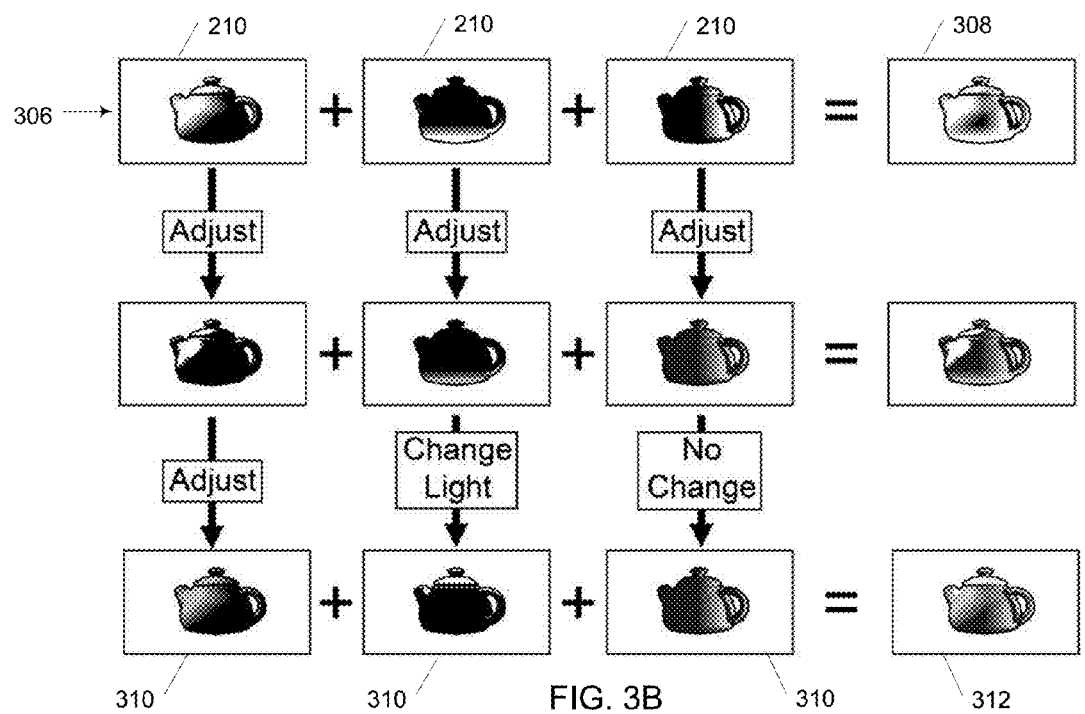
FIG. 3B is a conceptual drawing illustrating how rendered images from FIG. 3A are adjusted and combined to form a composite image.

FIG. 3B depicts an exemplary embodiment of step 304. According to row 306, three images 210 of the overall set of images have been selected for asset 206. The composite of these three images is depicted according to 308. Moving vertically downward various adjustments are made to each image 210 such as color balance and intensity or even the selection of a different image from a different light source. The result is a set of adjusted images 310 and then a composite image 312 for the combination of the adjusted images 310.

Returning to FIG. 2: according to steps 304 and 314 data is stored that defines the selection of images 210 and the settings (i.e. color balance and intensity) for the composite image 312. This data may be metadata and may include information identifying the frame, asset(s), selected images 210 and settings (e.g., color balance and intensity).

According to step 212 information is fed back from the compositing sub-process 300 to the animation sub-process 100 and rendering sub-process 200. Step 212 indicates a key advantage of the present invention; the animator and compositor can collaborate effectively because only an automated rendering process separates them. According to step 110 the animator refines the entire sequence of frames based upon information received from the compositing sub-process 300. This information includes the data generated and stored during step 304, which defines selected images 210 and the settings (e.g., intensity, color balance) that define the composite image(s) 312.

According to step 112 the animator submits the entire sequence of frames for rendering. This utilizes the settings generated during step 304. According to step 214, the entire animation sequence is rendered using the settings from step 304.

After rendering is complete according to step 216, the rendered sequence is sent to the compositor for final compositing according to step 316. Based on the final compositing, the finished animation sequence is stored according to 318.

Figure 4:
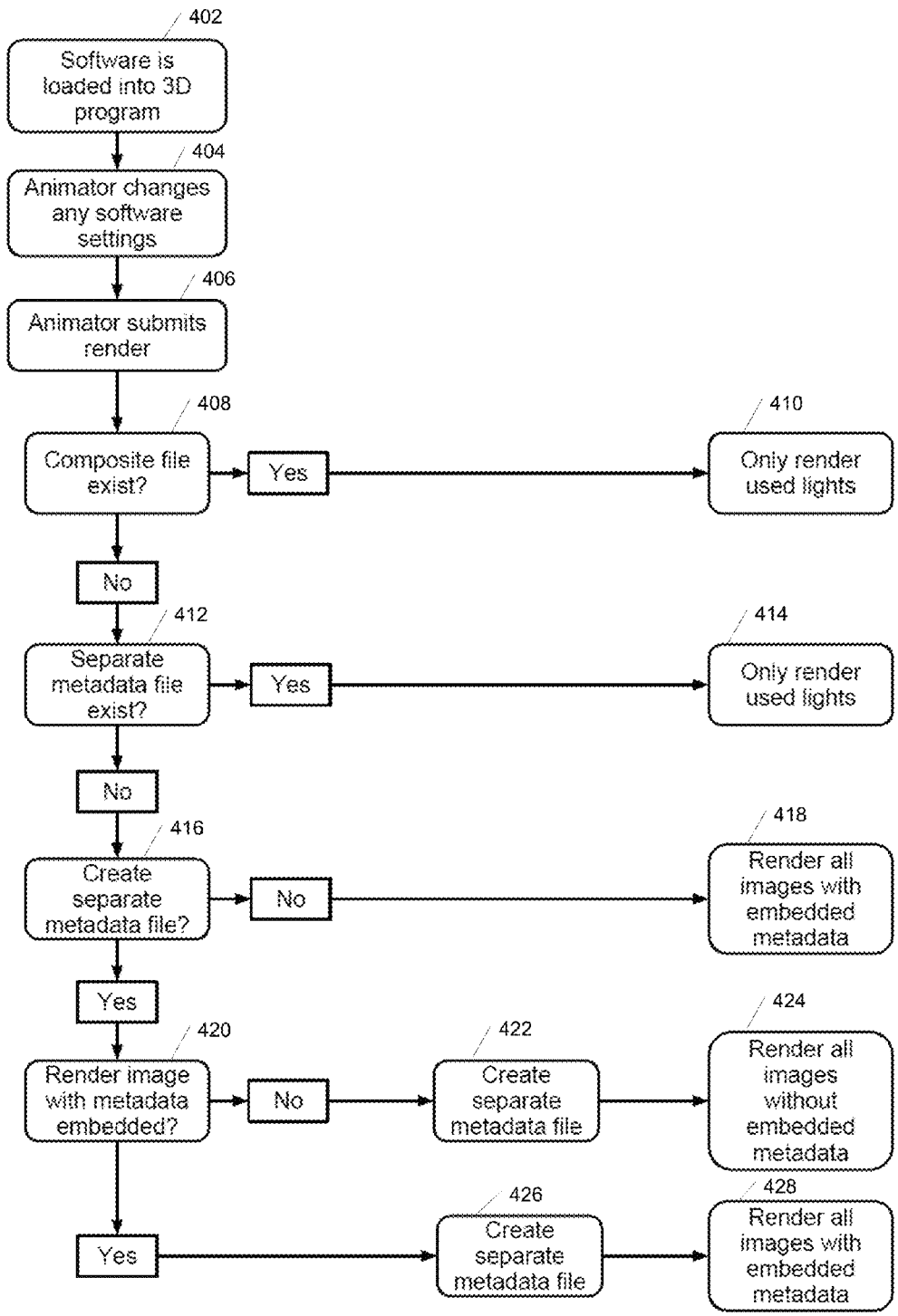
FIG. 4 is a flowchart depicting an exemplary rendering process.

An exemplary embodiment of a portion of sub-process 200 is depicted in FIG. 4. This may be embodied as a "plug-in" software module that cooperates with a rendering application. According to step 402, the rendering plug-in is loaded into a 3D rendering program. According to step 404 an animator using this application changes software settings. As part of step 404, the animator selects lighting variations. For example, the animator may select a dome light array with 100 different lights for each asset 206. Additionally the animator may select additional lighting instantiations such as a light embedded in asset 206. According to step 406 the animator submits frame(s) for rendering.

Step 406 may be equivalent or similar to step 202 or step 214 of FIG. 2. According to step 408, a determination is made as to whether a composite file already exists. A composite file already existing would imply that lighting conditions including lights and settings have already been selected by a compositor. If "YES" (i.e., a composite file does exists) then rendering will take place only using the used or selected lights according to step 410. Thus, step 410 may be similar or equivalent to step 214 of FIG. 2.

If no composite file exists, then a determination is made as to whether a separate metadata file exists that specifies lighting conditions according to step 412. If "YES" (i.e., metadata file does exist) then rendering takes place utilizing the lights specified by the separate metadata file according to 414. Thus step 414 may be similar to step 214.

If no composite or metadata file exists according to steps 408 and 412, then that would likely indicate that step 202 of FIG. 2 has not taken place. Therefore all of the lights of the set specified in step 404 would be used for rendering.

According to step 416, a determination is made as to whether to create a metadata file that is separate from the rendered image files. If "NO" (i.e. do not create a separate metadata file) for step 416, then all the images are rendered with metadata embedded into the images according to 418.

If according to step 416 a separate metadata file is to be created, then a decision is made at step 420 as to whether to render the images with embedded metadata. If "NO" (i.e. do not render the images with embedded metadata) according to step 420, then the separate metadata file is created according to step 422 and all the images are rendered without embedded data according to step 424.

If "YES" (i.e. do render the images with embedded metadata) according to step 420, then a separate metadata file is created according to step 426 and the images are rendered with embedded metadata according to step 428.

In a preferred embodiment, each of steps 418, 424, and 428 corresponds to step 202 of FIG. 2 and is carried out initially on the selected or most important frames of the animation sequence in order to generate a complete set of images for a complete set of illumination conditions specified by the animator. This rendering step is reasonable in terms of processor usage because typically only one, two, or a small number of frames are initially rendered.

Later after images from the set of images have been selected, adjusted, and optimized, then the complete sequence of frames in the animation may be rendered according to one of steps 410 or 414 which correspond to step 214 of FIG. 2. This is reasonable in terms of processor usage because, although all of the frames are rendered, the illumination settings used are limiting the number of lights included in rendering to those previously selected in an earlier compositing step.

Figure 5:
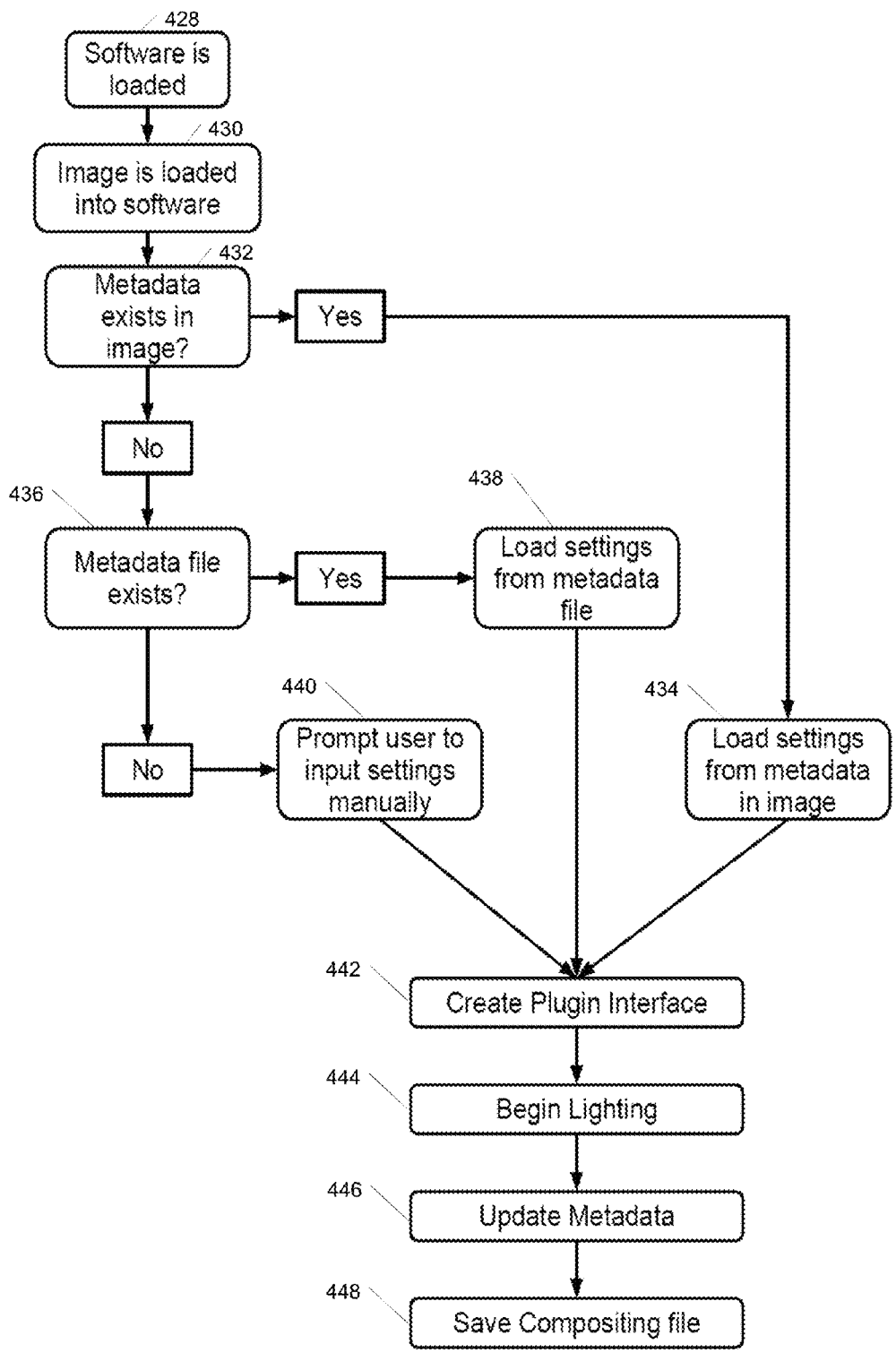
FIG. 5 is a flowchart depicting an exemplary compositing process.

An example of a portion of sub-process 300 is depicted in FIG. 5. This may be embodied as a plug-in software module that cooperates with the compositing application. According to step 428, the plug-in software is loaded into the compositing program. According to step 430, image data is loaded, and the image data includes data for one or more frames.

According to step 432, a determination is made as to whether the image data contains embedded metadata specifying illumination settings. If "YES", then the illumination settings are applied to the image data according to step 434.

If the image(s) themselves don't contain embedded metadata, then a determination is made as to whether a metadata file exists according to step 436. Such a metadata file would specify illumination settings. If the metadata file exists (i.e. if "YES"), then the illumination settings are loaded according to step 438. If the file does not exist (i.e. if "NO"), then the user is prompted to input illumination settings manually according to step 440.

Figure 6:
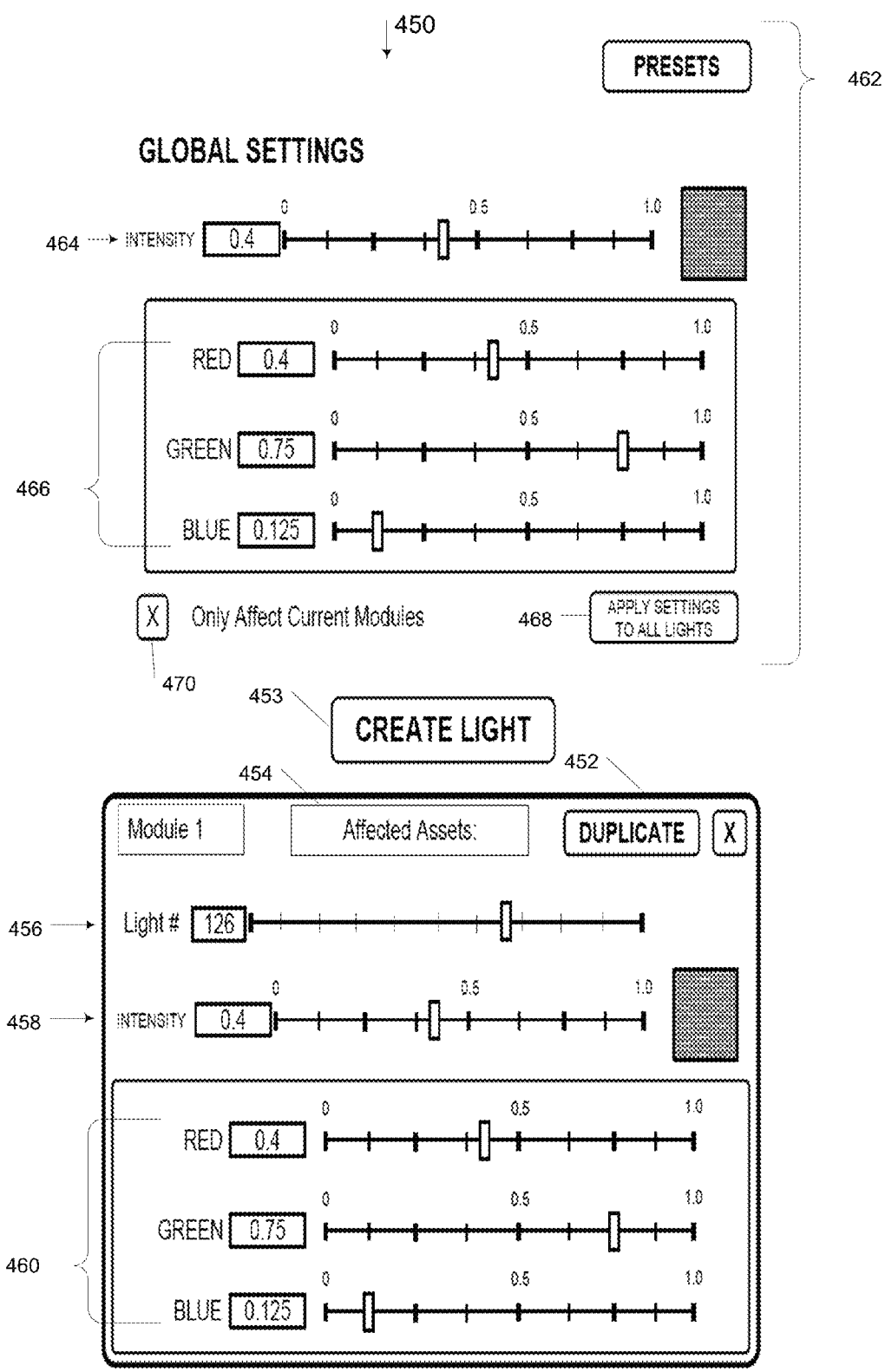
FIG. 6 is a diagram of a user interface that may be utilized for selecting from a full set of rendered images and to make color balance and intensity adjustments upon those images for a resultant composite image.

According to step 442, an interface is generated upon the compositor's display that enables selection and adjustment of illumination settings. An exemplary interface according to step 442 is depicted in FIG. 6. This interface may be utilized whether or not a metadata file exists. If such a metadata file exists then the interface will reflect the associated illumination settings. Otherwise the compositor must establish the settings manually.

According to step 444, the compositor makes or adjusts settings using the interface. Also according to step 444 the compositor may make additional adjustments using a different interface that may allow adjustment of other parameters such as blurring or distortion. Based upon the compositor's settings, the metadata describing the settings is updated according to step 446. According to 448, a resultant compositing file is saved.

An exemplary user interface utilized according to steps 442 and 444 is depicted in FIG. 6. This interface may also be used as part of the compositing sub-process of FIG. 2. This interface enables the selection and modification of global settings (i.e., those that may affect all assets and/or lights) and to make adjustments for individual lights.

Referring back to FIG. 2 step 108 or FIG. 4 step 404, an animator makes a selection of lights to be used in rendering the selected or most important frames of an animated sequence of images. This may include dome lights and other kinds of lights that may be embedded into assets. Once this selection is made the rendering is then performed using all the lights according to step 202 to produce rendered images. An example of such rendered images has been discussed with respect to FIG. 3A. This sets the stage for an initial use of the interface 450 depicted in FIG. 6 during which a compositor selects among the lights 208 and makes adjustments including color balance, intensity, and perhaps other parameters or visual effects.

Interface 450 includes module 452 with which the settings for individual lights are to be adjusted. In one embodiment module 452 may be generated upon a display by selecting a "create light" button 453. Included in module 452 is an input 454 that determines which assets are to be affected by module 452. If just one asset is included, then each light corresponds to one rendered image 210.

An adjustment slider bar 456 enables the selection of individual lights to be applied to the indicated assets. In the illustrated embodiment the compositor has selected light 126 and has made various adjustments including intensity 458 and color balance 460. In this case, red, green, and blue channels can be individually adjusted. Other embodiments of color balance adjustment are possible such as "color wheels", "color pickers", and various conventional graphical user interface-based methods of selecting a color balance. Not shown in FIG. 6 are other adjustments and selections for various image parameters and special effects that may be included. The compositor will be able to view the effects of the adjustments on an asset 206 while these settings are being adjusted. When adjustments are complete, the settings may be stored as metadata in accordance with 446 discussed with respect to FIG. 5.

Later if the compositor decides to use this software again, the existing metadata created earlier will be loaded according to step 434 or 440 discussed with respect to FIG. 5. When final rendering does take place (step 214 of FIG. 2) the final metadata update from step 446 of FIG. 5 will be used.

The user interface portion 452 is a single "module" and additional such modules (not shown) may be utilized in order to input additional lighting data. All of these would operate in a manner similar to the portion 452 depicted. In an exemplary embodiment, additional modules similar to module 452 are launched in response to the selection of "create light" button 453. In this way, different assets can be independently illuminated with different lights and light settings.

User interface 450 may include a portion 462 for applying global settings to all assets. Thus, if a global intensity 464 is adjusted then all of the selected light sources would have intensities adjusted. A similar adjustment 466 may be used for adjusting color balance. If each selected lights source already has an intensity and color balance setting then this adjustment would just provide a proportional change to the entire set of light sources, maintaining the relative values between light sources. Another button 468 enables adjustments to be made for all lights including those that have not been selected. Alternatively a selection 470 allows adjustments to be made only to selected current modules such as module 452 illustrated.

The software for sub-processes has been described as two plug-in software modules that can be utilized with existing rendering and compositing software. However this need not be the case. The plug-in approach may be used to enhance existing rendering and compositing programs. However this capability may also be included or integrated in these programs and the present invention anticipates both alternatives. Moreover there may be advantages with integrating different software sub-processes into one software package and/or to run different sub-processes on the same computer as computers become more powerful. Any of these or other such alternatives are anticipated by the present invention.

Figure 7:
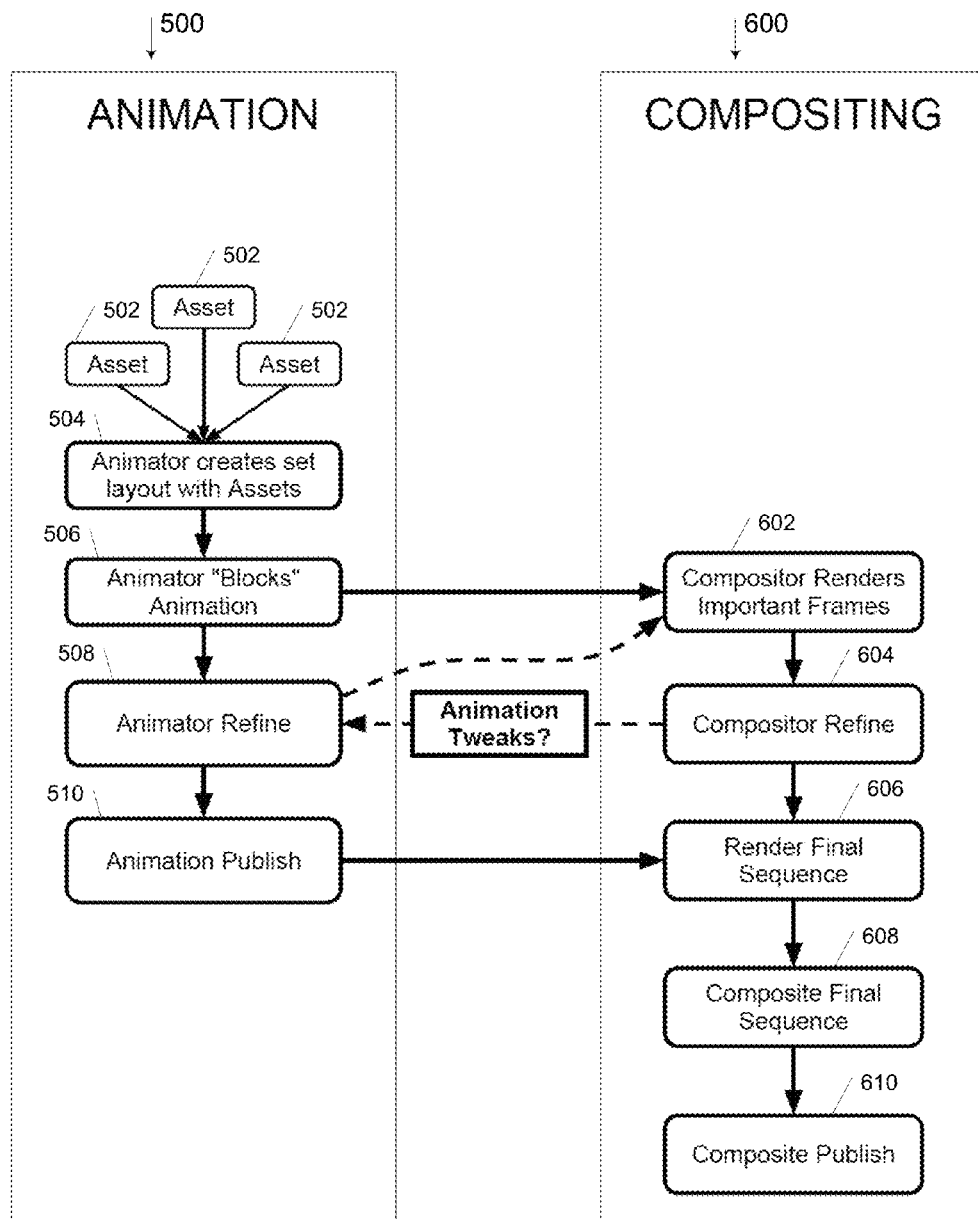
FIG. 7 is a process flow diagram that depicts an alternative process according to the present invention of generating an animated sequence of images starting with assets.

FIG. 7 is a process flow diagram that depicts a system wherein the software components are more integrated such that rendering has been integrated into compositing. With this embodiment the overall process has only two sub-processes including animation 500 and compositing 600. There are no software plug-ins and the present invention is substantially integrated into the compositing sub-process 600.

Assets are provided according to step 502. Assets have been previously described with respect to FIG. 1. According to step 504, the animator creates a set layout using assets 502. According to 506 the animator "blocks" the animation including defining the important frames in the animation sequence. The animation file is then given or transferred to the compositor.

According to step 602, the compositor selects a full set of illumination conditions (i.e. a full set of lights) and then renders the most important frames accordingly. The discussion with respect to FIG. 3A still applies to step 602. According to step 604 the compositor selects a subset of the full set of lights and makes color balance and intensity adjustments for each light and for each asset. Step 604 may include the use of an interface that is similar to that depicted with respect to FIG. 6. At this point the compositor may be satisfied with the results. If so, the compositor has the entire sequence of frames rendered according to step 606. Step 606 would utilize the subset of lights and color and intensity adjustments that the compositor selected in step 604 and perhaps in step 606.

Returning back to step 604 the compositor may see a need for animation adjustments (shown as "animation tweaks" in FIG. 7). Then the process would move to step 508 in which the animator makes refinements on the frames and then stores the refinements according to step 510. If necessary the process may return to step 602 again to further refine lighting. Alternatively, if there is no further need for animation or lighting changes then the process moves to step 606 for final rendering of the entire sequence. After full rendering there is a final step of compositing according to step 608 and then storage of a finished complete animation sequence according to step 610.

The specific embodiments and applications thereof described above are for illustrative purposes only and do not preclude modifications and variations encompassed by the scope of the following claims.

I claim:

1. A non-transitory computer readable medium having computer readable instructions stored thereon that, when executed by a computer, cause the computer to perform steps for compositing a sequence of frames each having an asset to define an animated sequence comprising:

receiving a sequence of frame sets, each frame set for one of the sequence of frames defining the animation sequence and each frame set including a plurality of rendered images that each depicts the asset with the same viewpoint but with a different illumination condition;

generating at least one user interface upon a computer display;

for each frame set, receiving a selection of a subset of the plurality of the rendered images whereby the selection defines a composite illumination for each frame set of the sequence of frames; and compositing each of the sequence of frames to form the animated sequence including merging the selected subset of rendered images for each frame set to provide the composite illumination for the animated sequence thereby replacing the need for a lighting process to be performed before rendering the frames.

2. The non-transitory computer readable medium of claim 1 wherein the asset is a computer defined object having at least one of a three dimensional shape, a texture and an axis of relative rotation for portions of the asset.

3. The non-transitory computer readable medium of claim 1 wherein the asset is a plurality of assets.

4. The non-transitory computer readable medium of claim 3 wherein at least one of the illumination conditions is based upon a light source embedded into one of the assets.

5. The non-transitory computer readable medium of claim 1 wherein each different illumination condition is based upon a simulated location of a light source relative to the asset.

6. The non-transitory computer readable medium of claim 1 wherein compositing the frame sequence further includes receiving an intensity adjustment from the at least one user interface that alters a lighting intensity for one or more assets for one or more frames of the frame sequence.

7. The non-transitory computer readable medium of claim 1 wherein compositing the frame sequence further includes receiving a color balance adjustment from the at least one user interface that alters a color hue for one or more assets for one or more frames of the frame sequence.

8. The non-transitory computer readable medium of claim 1 wherein the composited frame sequence includes a composited keyframe sequence and further comprising rendering additional frames of the animated sequence using lighting conditions at least partially defined by the composited keyframe sequence.

9. A computer-implemented method for compositing a sequence of frames each having an asset to define an animated sequence, the computer implemented method performed by a processor executing software instructions stored on a non-transitory medium, the computer-implemented method including:
receiving a sequence of frame sets, each frame set for one of the sequence of frames defining the animation sequence and each frame set including a plurality of rendered images that each depicts the asset with the same viewpoint but with a different illumination condition;
generating at least one user interface upon a computer display;
for each frame set, receiving a selection of a subset of the plurality of the rendered images whereby the selection defines a composite illumination for each frame set of the sequence of frames; and
compositing each of the sequence of frames to form the animated sequence including merging the selected subset of rendered images for each frame set to provide the composite illumination for the animated sequence thereby replacing the need for a lighting process to be performed before rendering the frames.

10. The method of claim 9 wherein the asset is a computer defined object having at least one of a three dimensional shape, a texture and an axis of relative rotation for portions of the asset.

11. The method of claim 9 wherein the asset is a plurality of assets.

12. The method of claim 11 wherein at least one of the illumination conditions is based upon a light source embedded into one of the assets.

13. The method of claim 9 wherein the rendered images differ according to luminance.

14. The method of claim 9 wherein each rendered image includes data defining the asset and a light source location relative to the asset to specify the illumination condition.

15. The method of claim 9 wherein each illumination condition is defined by a location of a light source relative to the asset.

16. The method of claim 9 wherein each illumination condition is based on an arrangement of light sources distributed upon a spherical surface and a selection therefrom.

17. The method of claim 9 wherein compositing further includes receiving a selection of an intensity and a color balance for each image within the subset of selected images from the at least one user interface.

18. The method of claim 9 wherein the composited frame sequence includes a composited keyframe sequence and further comprising rendering additional frames of the animated sequence using lighting conditions at least partially defined by the composited keyframe sequence.

19. A computer system for compositing a sequence of frames each having an asset to define an animated sequence, the computer system comprising:
a processor;
non-transitory medium storing computer readable instructions that, when executed by the processor, cause the apparatus to perform:
receiving a sequence of frame sets, each frame set for one of the sequence of frames defining the animation sequence and each frame set including a plurality of rendered images that each depicts the asset with the same viewpoint but with a different illumination condition;
generating at least one user interface upon a computer display;
for each frame set, receiving a selection of a subset of the plurality of the rendered images whereby the selection defines a composite illumination for each frame set of the sequence of frames; and
compositing each of the sequence of frames to form the animated sequence including merging the selected subset of rendered images for each frame set to provide the composite illumination for the animated sequence thereby replacing the need for a lighting process to be performed before rendering the frames.

20. The computer system of claim 19 further comprising a second computer system including:
a second processor;
a second non-transitory medium storing computer readable instructions that, when executed by the processor, cause the computer system to render each of the plurality of rendered images for each frame set.

* * * * *